US008256801B2

(12) United States Patent
Hagen et al.

(10) Patent No.: US 8,256,801 B2
(45) Date of Patent: Sep. 4, 2012

(54) COUPLING DEVICE FOR MEDIA CONDUITS

(75) Inventors: Harald Hagen, Wipperfürth (DE); Josef Brandt, Wipperfürth (DE)

(73) Assignee: Voss Automotive GmbH, Wipperfürth (DE)

( * ) Notice: Subject to any disclaimer, the term of this patent is extended or adjusted under 35 U.S.C. 154(b) by 660 days.

(21) Appl. No.: 11/782,471

(22) Filed: Jul. 24, 2007

(65) Prior Publication Data

US 2008/0014774 A1 Jan. 17, 2008

Related U.S. Application Data

(63) Continuation of application No. PCT/EP2006/050413, filed on Jan. 24, 2006.

(30) Foreign Application Priority Data

Jan. 24, 2005 (DE) ..................... 20 2005 001 153 U

(51) Int. Cl.
*F16L 39/00* (2006.01)

(52) U.S. Cl. ...... 285/124.5; 285/19; 285/65; 285/124.1; 285/124.4

(58) Field of Classification Search .................... 285/19, 285/20, 23, 65, 120.1, 124.1, 124.3, 124.4, 285/257, 124.5
See application file for complete search history.

(56) References Cited

U.S. PATENT DOCUMENTS

| | | | | |
|---|---|---|---|---|
| 1,899,861 | A * | 2/1933 | Gackenbach | 285/124.5 |
| 1,974,402 | A * | 9/1934 | Templeton | 165/72 |
| 2,628,850 | A * | 2/1953 | Summerville | 251/149.7 |
| 3,469,863 | A * | 9/1969 | Riester et al. | 285/124.4 |
| 3,779,584 | A | 12/1973 | Ignatjev | |
| 3,888,518 | A * | 6/1975 | Delessert | 285/39 |
| 4,555,130 | A | 11/1985 | McClain et al. | |
| 2002/0163187 | A1* | 11/2002 | Pelfrey et al. | 285/124.1 |
| 2005/0184510 | A1* | 8/2005 | Langenfeld et al. | 285/124.1 |

FOREIGN PATENT DOCUMENTS

| | | | |
|---|---|---|---|
| DE | 3827795 | A1 | 4/1989 |
| DE | 8904141 | U1 | 5/1989 |
| EP | 0382484 | A | 8/1990 |
| EP | 0618393 | A | 10/1994 |
| GB | 1216767 | A | 12/1970 |

* cited by examiner

*Primary Examiner* — Aaron Dunwoody
*Assistant Examiner* — Fannie Kee
(74) *Attorney, Agent, or Firm* — Brinks Hofer Gilson & Lione

(57) ABSTRACT

A coupling device for tubes and/or pipes comprising two substantially identical plate-type coupling parts is provided. Each coupling part has an even number of openings to receive inserted plug-in couplings configured as plug parts or socket parts. In one embodiment, the receiving openings for plug parts are arranged mirror-symmetrically across an axis of symmetry from the receiving openings for socket parts. The plug and socket parts are joined by first inserting and securing them into their respective receiving openings in the two coupling parts, then connecting the coupling parts.

21 Claims, 5 Drawing Sheets

COUPLING DEVICE FOR MEDIA CONDUITS

CROSS REFERENCE TO RELATED APPLICATION

This application claims priority to PCT/EP2006/050413, filed 24 Jan. 2006 and DE 20 2005 001 153.3, filed 24 Jan. 2005.

BACKGROUND OF THE INVENTION

The present invention relates to a coupling device for tubes and/or pipes, in particular for wall ducts of flow media conduits. The device has two plate-type coupling parts which can be connected to each other in a parallel arrangement, with each having receiving openings for the insertion and for the fixed securing of plug-in coupling parts, more precisely plug parts and socket parts, in such a manner that, by connection of the coupling parts, the plug and socket parts are plugged one into the other in pairs in a joining direction.

Coupling devices of this general type, including devices having some of the features described in EP 0618393 A1/B1, have been in practical use in an embodiment as a multiple coupling, for example, being used for a conduit duct in the region of an installation wall ("bulkhead wall") in a motor vehicle. In the case of the embodiment which has been previously used, a plurality of plug-in coupling parts are held in each case in two coupling plates, plug parts being held in the one coupling C plate and the corresponding socket parts being held in the other coupling plate. One of the coupling plates has latching means for fixing to the installation wall, with an elastic sealing element being required to compensate for play. For the connection of the two coupling plates, the one coupling plate has metallic screwthread inserts into which metric screws can be screwed through holes in the other coupling plate. Only by this mutual connection are the coupling plates fastened fixedly to the installation wall, by the wall being clamped in some regions between the coupling plates. The known embodiment is associated with a fairly high outlay on production, storage, etc. because of the two greatly different coupling plates designed specially in each case for the plug side and socket side. In addition, the installation is also sometimes difficult because the fixing of the one coupling plate merely by latching (pre-fixing) during the coupling operation is often not sufficiently secure, and therefore the coupling plate may be detached from the installation wall during the joining operation of the other coupling plate if it is not additionally secured manually, but this is not always possible depending on the fitting situation.

The object of the present invention is to provide a coupling device which requires reduced outlay on production and with improved use properties.

SUMMARY OF THE INVENTION

According to the invention, two coupling parts are designed as substantially identical molded parts. In one embodiment, each coupling part has both a certain number of receiving openings for plug parts and an identical number of receiving openings for socket parts, to be precise at least one plug-receiving opening and at least one socket-receiving opening in each case. The two types of receiving openings are arranged in pairs mirror-symmetrically to other across an axis of symmetry for each coupling part. The coupling parts are thus connectable from a same initial position by relative rotation of one of the coupling parts through 1800 about the axis of symmetry for the purpose of plugging the plug-in coupling parts one inside the other.

By means of the measure according to the invention, both coupling parts (sometimes referred to herein as coupling plates) can be produced substantially identically, in a particular embodiment as plastic molded parts from one and the same forming die. This results in a substantial saving of at least 50% of the previous die costs. It should be noted that the term "substantially identically" is to be understood as meaning that, despite the molding in one and the same forming die, the finished coupling parts may also be slightly different from each other, for example, because of certain interchangeable inserts of the die and/or because of an individual processing of the molded parts after the forming operation, such as, for example, installation of various threaded pieces or the like.

In another embodiment of the invention, each coupling part also has substantially identical means, firstly, for securing it to an installation wall and, secondly, for the mutual connection to the respectively other coupling part. The two holding connections advantageously take place with the use of self-tapping or self-thread-forming screws which are each screwed directly into initially smooth-walled holes (also sometimes referred to as "blind holes") of the respective coupling part. This also renders special threaded inserts superfluous. The screw fastening to the installation wall achieves secure fixing which eliminates the risk of detachment during the coupling operation. In addition, compensation for play is no longer required.

Further advantageous refinements of the invention are contained in the dependent claims and in the description below.

DETAILED DESCRIPTION OF THE INVENTION

Figure 1:
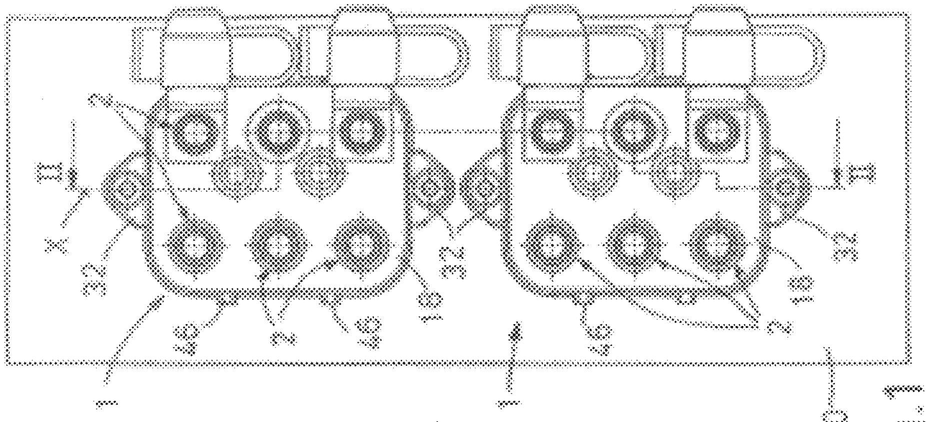
FIG. 1 shows a view of one side of an installation wall in a fitting situation, with two coupling devices shown arranged one above the other.

In order that the present invention may be more readily understood, embodiments thereof will now be described, with reference to the accompanying drawings. The following description is merely exemplary in nature and is in no way intended to limit the invention or its application or uses.

In the various figures of the drawing, identical parts are provided with the same reference numbers. Each description of a part, which is possibly only undertaken once with reference to one of the figures of the drawing, applies analogously with respect to the other figures of the drawing in which that part can likewise be seen with the corresponding reference number.

Figure 4:
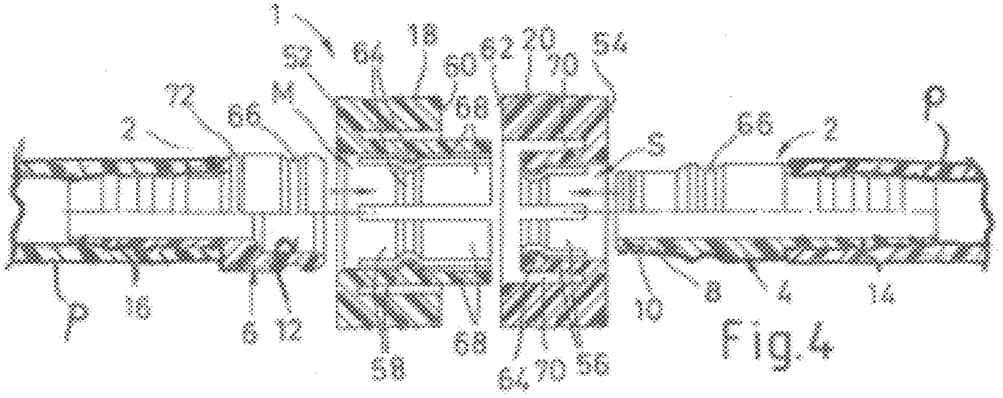
FIG. 4 is an enlarged sectional of the socket part, plug part, and receiving openings for each of these components in a state in which they are not yet fitted.
Figure 5:
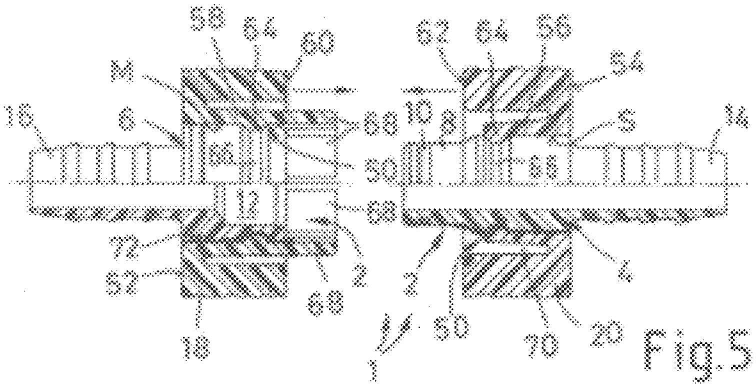
FIG. 5 is an enlarged section showing the plug and socket parts fully inserted into their respective receiving openings, but prior to the coupling parts being connected.
Figure 6:
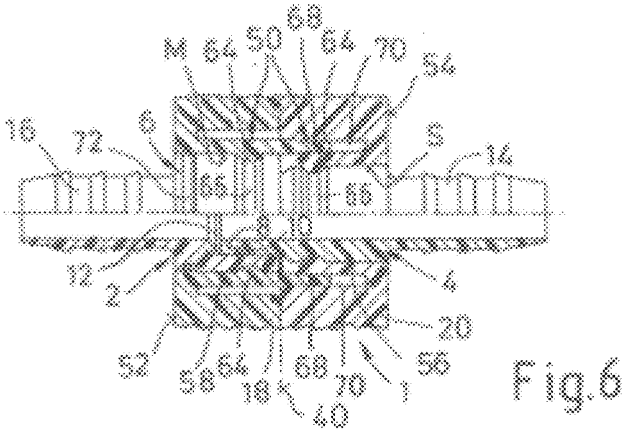
FIG. 6 shows the plug-in coupling parts fully inserted and the coupling parts connected.
Figure 8:
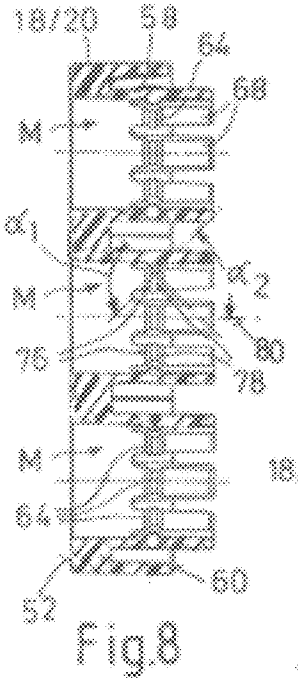
FIG. 8 is an enlarged section of the coupling part of FIG. 7.
Figure 7:
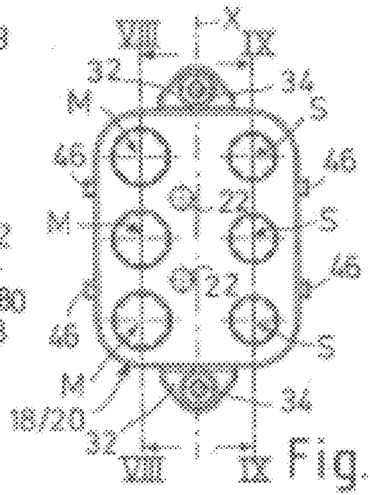
FIG. 7 is a view of the rear side of a coupling part prior to insertion of plug-in coupling parts.
Figure 9:
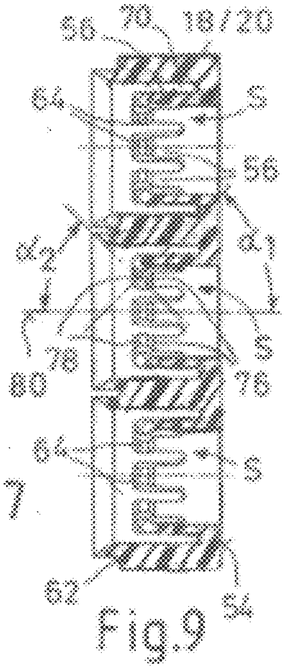
FIG. 9 is another enlarged section of the coupling part of FIG. 7.
Figure 10:
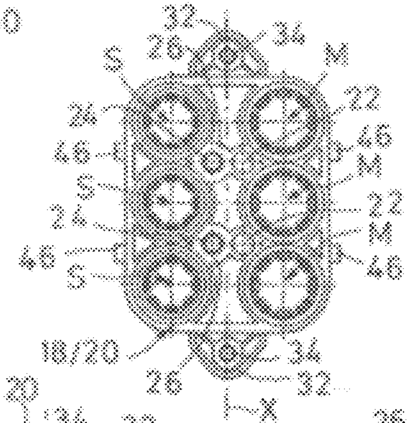
FIG. 10 is a view of the coupling side of the coupling part of FIG. 7.
Figure 11:
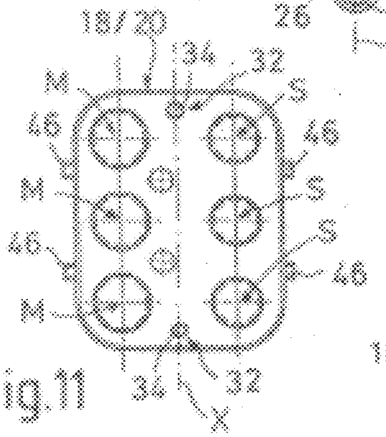
FIGS. 11 and 12 show illustrations analogous to FIGS. 7 and 10 of another embodiment incorporating variant wall fastener sections.
Figure 12:
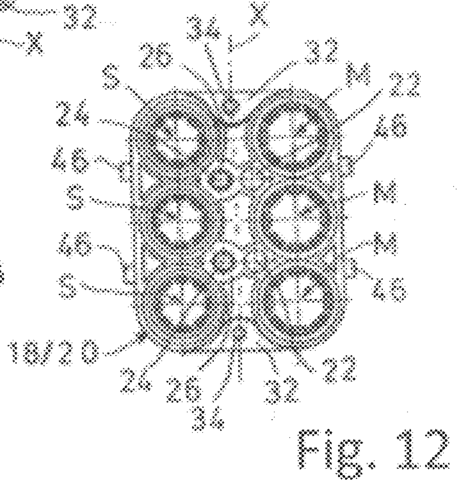
Figure 13:
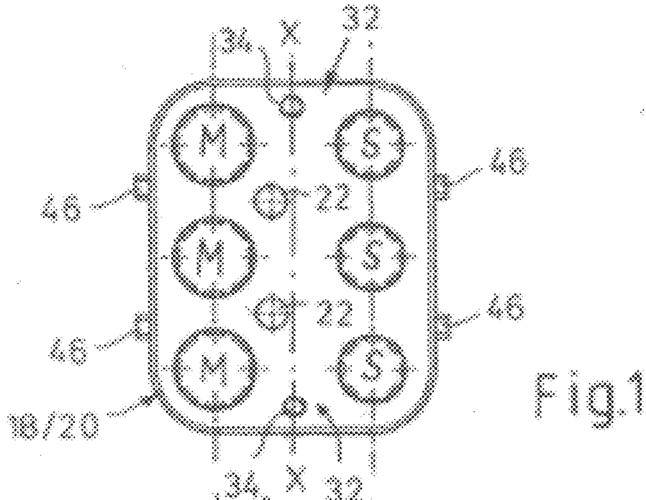
FIGS. 13 to 15 are illustrations analogous to FIG. 11 for showing several embodiment possibilities regarding distribution of plug- and socket-receiving openings of the coupling part.
Figure 14:
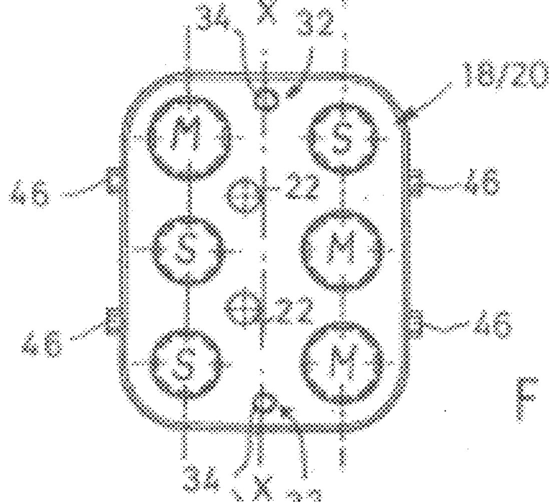
Figure 15:
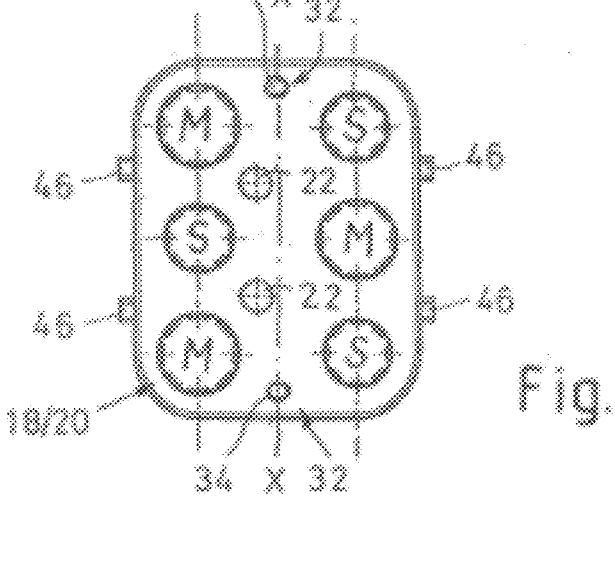

A coupling device 1 according to the invention is provided for an even number of at least two, and in the illustrated embodiment six, plug-in couplings 2. The coupling device comprises two plug-in coupling parts, a plug part 4 and a socket part 6. As best seen in FIGS. 4-6, each plug part 4 has a plug stem 8 which can be inserted in a circumferentially sealed manner, in particular via a sealing ring 10 sitting in an outer annular groove, into a plug-in receptacle 12 of the corresponding socket part 6 (see FIG. 6 in this respect).

At its end facing away from the plug stem 8, each plug part 4 has a connecting piece 14, designed in particular as a customary drive-in spike. Similarly, each socket part 6 has a connecting piece 16 which faces axially away from the plug-in receptacle 12 and is likewise preferably designed as a drive-in spike. These connecting pieces 14, 16 serve to connect media conduits (shown as "P" in FIGS. 2 and 4), in particular plastic pipes (preferably made of polyamide, PA), by each conduit being placed onto one of the connecting pieces 14, 16.

Figure 2:
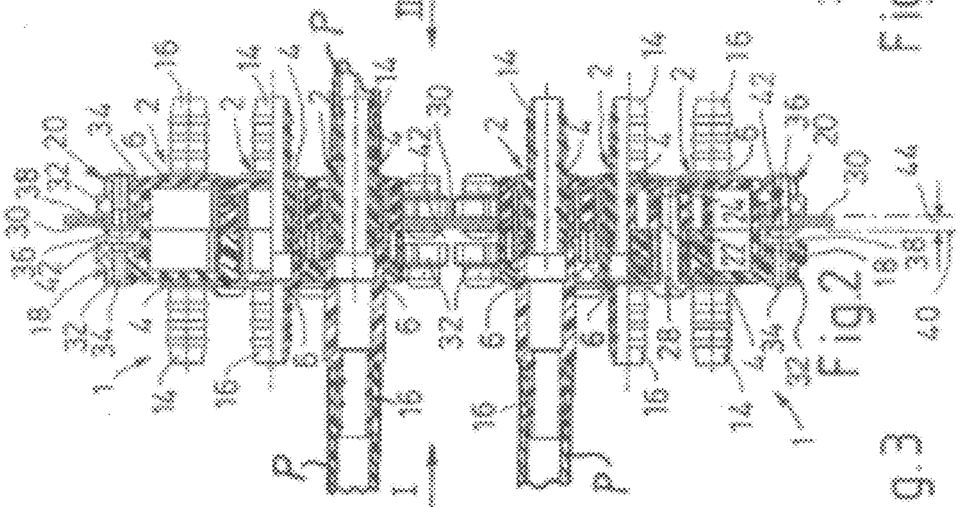
FIG. 2 shows a section perpendicular to the installation wall along the section line II-II in FIG. 1.
Figure 3:
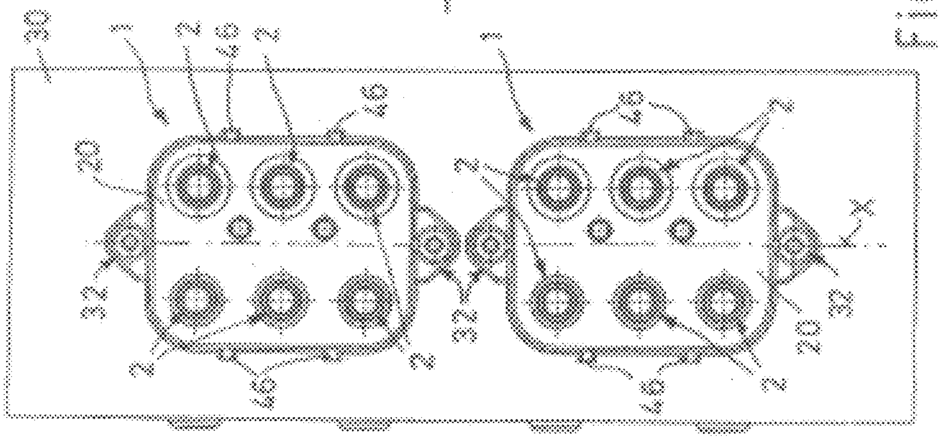
FIG. 3 shows a view of the other side of the arrangement according to FIGS. 1 and 2.

As shown in FIGS. 1-3, the coupling device 1 furthermore has two essentially plate-like coupling parts 18, 20 for the securing and retention of the plug-in coupling parts 4, 6 of the plug-in couplings 2. Returning to the enlarged sectional views of FIGS. 4-6, in the region of each plug-in coupling 2, the one coupling part (e.g. 20) has a receiving opening S for the plug part 4 while the other coupling part (e.g. 18) has a receiving opening M for the associated socket part 6 (see FIGS. 4-15). The coupling parts 20, 18 can be connected to each other in an essentially parallel arrangement in such a manner that the receiving openings S, M are located opposite each other in an axially aligned manner, and the plug-in coupling parts 4, 6 sitting in each case in the receiving openings S, M are plugged together when the coupling parts 20, 18 are joined together. This can be easily understood with reference to FIGS. 5 and 6.

The socket part receiving openings M understandably have a greater opening cross section than the plug part receiving openings S. In addition, the receiving openings S, M differ slightly with regard to the securing of the plug and socket parts 4, 6. This is explained in more detail further below.

According to the invention, it is provided that the two coupling parts 18 and 20 are designed at least substantially identically, in one embodiment as single-piece, monolithic plastic molded parts in each case. Production in one and the same forming die is advantageously possible because of the substantial identicality. The coupling parts 18, 20 are expediently composed of a fiber-reinforced plastics material, for example PA66-GF30.

Each of the substantially identical coupling parts 18, 20 has both a certain number of receiving openings S—for example three, as illustrated—for plug parts 4 and the same number of receiving openings M for socket parts 6. In each coupling part 18 or 20, the two types of receiving openings S and M are each arranged symmetrically opposite each other in pairs with respect to an axis of symmetry X. By this means, the coupling parts 18 and 20 can be connected from an identical initial position in space by rotation of one of the coupling parts through 180° about the axis of symmetry X relative to the other coupling part for the purpose of coupling the plug-in couplings 2 or the plug and socket parts 4, 6. It should be noted that, for the coupling device 1 to be capable of functioning, not all of the receiving openings S, M present have to be equipped with plug parts 4 or socket parts 6; it suffices if one of the coupling parts has (at least) one plug part 4 and the other coupling part has a socket part 6 (at least) in the associated receiving opening M.

An advantage of a symmetrical arrangement of the receiving openings S and M is that the coupling parts 18, 20 can be coupled to each other only in a relative position. Consequently, the mutually assigned plug and socket parts 4, 6 cannot be mixed up during the connection.

There are various possibilities for the arrangement and distribution of the two types of receiving openings S and M on the surface of the respective coupling part 20, 18. According to FIGS. 7-13, receiving openings S or M of the same type can be arranged in each case on each side of the axis of symmetry X. As illustrated by way of example in FIGS. 14 and 15, different types of receiving openings S and M may also be arranged on each side next to the axis of symmetry X, but the respectively other type of receiving opening has to be provided mirror-symmetrically opposite in each case.

Each coupling part 18 or 20 has, for the mutual connection to the respectively other coupling part 20 or 18, at least one passage hole 22 and at least one screw hole 24 in a mutually opposite arrangement symmetrically with respect to the axis of symmetry X. Preferably, in each case two passage holes 22 and two screw holes 24 are provided which are spaced apart from one another in the direction of the axis of symmetry X or parallel thereto. Each screw hole 24 is designed in particular as a blind hole extending as a tube- or bulge-like extension piece 26 from the outer, or rear, side of the coupling part in such a manner that a self-tapping, i.e. self-thread-forming, screw 28 (see FIG. 2) can be screwed in each case through the passage hole 22 of the one coupling part 18/20 directly into the screw hole 24 of the other coupling part 20118. The passage holes 22 and screw holes 24 can be located in each case in a surface region between the receiving openings S, M. In this case, said holes 22, 24 may lie close to the axis of symmetry X in order to connect the two coupling parts 18, 20 to each other in a sufficiently fixed manner over their entire surface region.

Figure 17A:
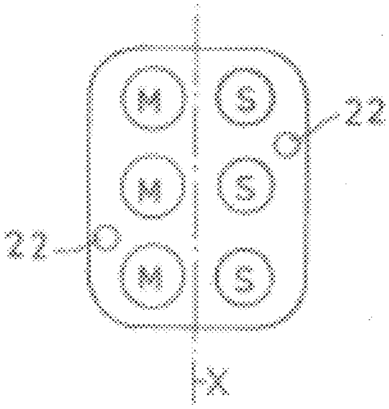
FIGS. 17*a* and 17*b* show an alternative embodiment of the coupling part in views analogous to FIGS. 11 and 12, showing a) view of the rear side and b) view of the coupling side.
Figure 17B:
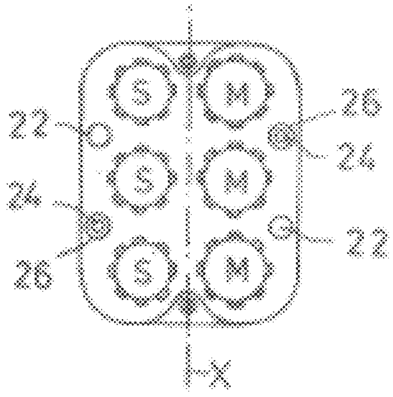

In another embodiment illustrated in FIGS. 17*a* and 17*b*, the receiving openings S, M are located close to the axis of symmetry X, and therefore the passage holes 22 and the extension pieces 26 can be arranged with the screw holes 24 in the outer edge region of the coupling parts. This advantageously results in better accessibility to the screws 28 during installation, particularly when conduits are fitted which are already connected via the connecting pieces 14, 16 to the plug-in coupling parts 4, 6 sitting in the receiving openings S, M.

For the fastening in the region of a correspondingly sized conduit passage opening in an installation wall 30 ("bulkhead wall", see FIGS. 1-3), each coupling part 18, 20 has at least two fastening sections 32 with installation holes 34 preferably lying on the axis of symmetry X. In one embodiment, said installation holes 34 are designed for the direct screwing-in of self-tapping screws 36. As seen in FIG. 2, only one of the two coupling parts 18, 20 is fastened to the installation wall 30 by the screws 36 being screwed through passage holes in the installation wall 30 into the installation holes 34 of the coupling part to be fastened in each case (e.g. 20). By this means, the coupling part 20 is fixed very securely to the installation wall 30. The other coupling part (e.g. 18) can subsequently be fitted and fastened with the screws 28 to the coupling part 20 which is fastened to the installation wall 30. In this situation, and as shown in FIG. 2, the fastening sections 32 and installation holes 34 of the other coupling part 18 are not used; instead coupling part 18 is fastened to the other coupling part 20. Each fastening section 32 has a wall bearing surface 38 which, as seen in FIG. 2, is offset parallel in relation to a coupling plane 40, which is located centrally between the connected coupling parts 18, 20. This offset wall bearing surface configuration allows sufficient clearance between the respectively mutually opposite fastening sections 32 of the two connected coupling parts 18, 20, allowing the device to receive a holding section of the installation wall 30 and, if appropriate, a screw head of the screw 36. Said offset between the bearing surface 38 and the coupling plane 40 is shown in FIG. 2 by the reference number 44. The clearance 42 between the two connected coupling parts is twice the distance of offset 44.

In the exemplary embodiments illustrated, each coupling part 18, 20 has a substantially rectangular surface form with preferably rounded corners. In the embodiments according to FIGS. 1-3 and 7-10, it is provided that the fastening sections 32 are formed on opposite sides of the rectangle, in particular the narrow sides, as extension pieces which protrude beyond the rectangular surface form. The advantage of this embodiment is that the installation wall 30 can have a simple, correspondingly rectangular passage opening. In one alternative embodiment according to FIGS. 11-15, the fastening sections 32 are formed as subregions within the surface form of the respective coupling part 18, 20. The advantage of this embodiment is a reduced space requirement in the case of a multiple arrangement of coupling devices (cf. FIGS. 1-3) in that the coupling devices 1 can be arranged closer together on the installation wall 30. However, in this embodiment, the installation wall 30 would ordinarily have inwardly extending wall sections in the region of the installation holes 34.

In both embodiments, the arrangement of the installation holes 34 on the axis of symmetry X permits any desired installation sequence, i.e. it is insignificant whether the coupling part 18 or the coupling part 20 is fastened on the particular side of the installation wall 30.

Since all of the above mentioned screw connections are arranged on or in the vicinity of the axis of symmetry X, it is advantageous if each coupling part 18 or 20 has at least two edge bearing elements 46 which are located opposite each other with respect to the axis of symmetry X and are intended for bearing against the installation wall 30 in a manner preventing tilting. As illustrated, a total of four bearing elements 46 can be provided in a paired arrangement on both longitudinal sides of each coupling part 18, 20.

Each plug-in coupling part 4, 6 may be fixed in the associated receiving opening S, M of the respective coupling part 20, 18 via latching means 50. As shown in FIGS. 5 and 6, the latching means provide that a plug-in coupling part 4 or 6, can be releasably latched with the coupling parts 18, 20 prior to coupling parts 18 and 20 being connected. (See FIGS. 4 and 5 in this respect). More particularly, plug part 4 can be inserted and fixed in opening S by a releasable latch from the rear side 52, 54 of coupling part 18 or 20. Similarly, socket part 6 can be releasably latched and fixed from the rear side of the other coupling part. In the connected state of the coupling parts 18, 20—see FIG. 6—the plug-in coupling parts (i.e. plug part 4 and socket part 6) are held in a form-fitting and therefore unreleasable manner by, in particular, automatic or mutual locking of the latching means 50.

In the exemplary embodiment illustrated in FIGS. 4-6, each coupling part 20, 18 has, as latching means 50, radially biased spring-elastic latching arms 56 and 58 which are distributed in each case over the circumference of the receiving opening S and M (and thus virtually form the respective receiving opening) and, in each case starting from the rear side 52 or 54 of the coupling part 18 or 20, extend essentially in or parallel to the joining direction of the plug-in couplings 2. In this case, in their region which faces the coupling side 60 or 62 of the respective coupling part 18, 20, the latching arms are movable in a spring-elastic manner in the radial direction. The latching arms 56, 58 have latching extension pieces 64 which protrude radially inward into the receiving opening S or M. Each extension piece 64 interacts in a latching manner with a circumferential annular groove 66 of the respective plug-in coupling part 4 or 6. In this embodiment, it is further provided that, in the region of each socket part receiving opening M, the latching arms 58 have locking extension pieces 68 which point in the joining direction. When the coupling parts 18, 20 are connected to each other, the extension pieces 68 engage in the axial direction with an annular gap 70, which surrounds the latching arms 56 of the other coupling part, in such a manner that all of the latching arms 56, 58 of the two coupling parts 20, 18 are then supported (locked) against a radial movement. This can readily be seen in FIG. 6. The locking extension pieces 68 connected to the latching arms 58 are supported on an outer annular surface which delimits the annular gap 70 to the outside, and the latching arms 56, for their part, are supported on the inner surfaces of the locking extension pieces 68. In this manner, the latching arms 56, 58 cannot move radially outward in this position, and therefore the coupling parts 4, 6 are held in a form-fitting and virtually nonreleasable manner. However, release is possible by separating the two coupling parts 18, 20. From the pre-connected state illustrated in FIG. 5, the plug-in coupling parts 4, 6 can be pulled out of the receiving openings S, M by overcoming the strong form fit of the latching means 50.

In particular in the case of vehicle applications, it is also advantageous if the plug-in coupling parts 4, 6 are circumferentially sealed in the respective receiving opening S, M. As illustrated in FIGS. 4-6, using the example of the socket part 6, for this sealing the respective plug-in coupling part 4, 6 can have a sealing ring 72 in an outer annular groove, the sealing ring being arranged in a circumferentially closed, continuous “joining region” of the latching arms 58 (or 56), i.e. in that region of the respective receiving opening S or M which directly adjoins the outer, rear mouth. Although not shown in FIGS. 4-6, a seal of this type may also be provided in the region of the plug part 4.

Figure 16A:
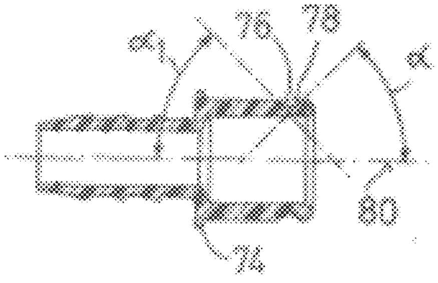
FIGS. 16*a* and 16*b* show sectional views of the socket part and the plug part in an embodiment of the invention.
Figure 16B:
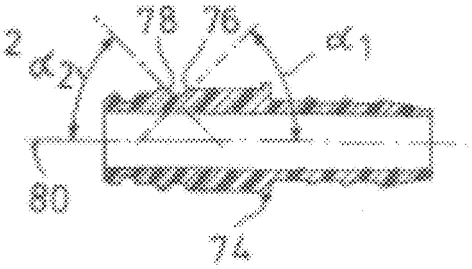

As shown in FIG. 16, the plug-in coupling parts 4, 6 may each have a stop element 74 as an insertion limitation in order to prevent the plug part 4 or the socket part 6 from being inserted too far into or through the respective coupling part 18, 20. In the example illustrated, an annular collar is provided in each case as the stop element 74 in such a manner that, in the correctly latched use position, the stop element 74 comes to bear in the region of the rear side 52, 54 of the respective coupling part 18, 20.

The coupling device may be configured to make insertion of the plug-in coupling parts easier than their removal. As shown in FIG. 16 in conjunction with FIGS. 8 and 9, in one embodiment the annular groove 66 of each plug-in coupling part 4, 6 and each latching extension piece 64 of the latching arms 56, 58 of the coupling parts 18, 20 firstly have, on their sides interacting in the insertion direction of the plug-in coupling parts 4, 6, first oblique surfaces 76, and secondly have, on their sides interacting in the removal direction, second oblique surfaces 78. In this case, the first oblique surfaces 76 enclose a first angle α1 and the second oblique surfaces 78 enclose a second angle α2 in each case measured relative to the plug-in axis 80. In this case, the first angle α1 is preferably smaller than the second angle α2. The effect achieved by this is that the plug-in coupling parts 4, 6 can be inserted with a lower force than they can be pulled out of the respective receiving opening S, M. The first angle α1 preferably lies in the range of from 15° to 60°, in particular 30° to 45°, while the second angle α2 is to lie in the range of from 30° to 90°, in particular 45° to 60°.

In this connection, the stop elements 74 of the plug and socket parts 4, 6 are particularly advantageous because they inhibit insertion beyond the actual latching position which would cause the latching arms 56, 58 to be expanded again and, as a result, the coupling parts 18, 20 could only be coupled with difficulty or could even no longer be coupled. Without the stop elements 74, this risk would be particularly great because of the smaller angle α1. As the angle of α2 is increased, (up to 90° for a form fit=nonreleasable), the likelihood decreases that the physical coupling of coupling parts 18, 20 would result in the plug-in coupling parts 4, 6 being pulled or pushed out of the respective coupling part 18, 20 by preassembled conduits.

The features disclosed in the foregoing description, or the following claims, or the accompanying drawings, expressed in their specific forms or in terms of a means for performing the disclosed function, may, separately, or in any combination of such features, be utilized for realizing the invention in diverse forms thereof. While the above description constitutes one or more embodiments of the present invention, it will be appreciated that the invention is susceptible to modification, variation and change without departing from the proper scope and fair meaning of the accompanying claims.

We claim:

1. A coupling device for tubes or pipes used for wall ducts of flow media conduits, comprising:

at least two plug-in coupling parts, each configured as a plug part;

at least two plug-in coupling parts, each configured as a socket part; and two identical, interconnectable, and molded coupling plate parts, each said coupling plate part having at least a first and a second receiving opening, the first and second receiving openings of each of the coupling plate parts being arranged in a pair symmetrically with respect to an axis of symmetry of each of the coupling plate parts, the first receiving opening used for the insertion and for the fixed securing of one of the plug parts and the second receiving opening used for the insertion and for the fixed securing of one of the socket parts, the first and second receiving openings differing in construction;

wherein the connection of the two coupling plate parts results in the plug parts being plugged into and paired in a joining direction with the socket parts; each plug part being secured within the first receiving opening of one of the coupling plate parts, each socket part being secured within the second receiving opening of the other coupling plate part.

2. The coupling device of claim 1, wherein each coupling plate part is a single-piece, monolithic plastic molded part.

3. The coupling device of claim 1, wherein each coupling plate part has, for the connection to the other coupling plate part, at least one passage hole and at least one screw hole in a mutually symmetrical arrangement with respect to an axis of symmetry.

4. The coupling device of claim 3, wherein each screw hole is configured to accept a self-tapping screw driven through the passage hole of the one coupling plate part directly into the screw hole of the other coupling plate part.

5. The coupling device of claim 1, wherein each coupling plate part has, for the fastening of the coupling device to an installation wall, at least two fastening sections, each fastening section having at least one installation hole located on or near an axis of symmetry.

6. The coupling device of claim 5, wherein the installation holes are configured to accept self-tapping screws.

7. The coupling device of claim 5, wherein each fastening section has a wall bearing surface offset from a coupling plane, whereby the offset wall bearing surfaces of the fastening sections of the two connected coupling plate parts are spaced sufficiently apart from one another to receive a holding section of the installation wall.

8. The coupling device of claim 5, wherein each coupling plate part has a substantially rectangular surface shape.

9. The coupling device of claim 1, wherein each coupling plate part has at least two bearing elements located opposite each other with respect to an axis of symmetry of the coupling plate part, for bearing against the installation wall.

10. The coupling device of claim 1, further comprising latching means configured to fix the plug part and the socket part in the first and second receiving openings associated with the plug part and socket part respectively, wherein the latching means are not releasable when the coupling plate parts are connected, and further wherein the latching means are releasable when the coupling plate parts are not connected such that the plug parts and the socket parts are releasable from a rear side of the coupling plate part facing away from a coupling side of the coupling plate part.

11. The coupling device of claim 10, wherein the latching means are radially biased spring-elastic latching arms distributed around the circumference of the receiving openings which extend essentially in the joining direction of the plug-in coupling parts.

12. The coupling device of claim 11, wherein the latching means comprise latching arms in the region of the coupling side of the coupling plate parts, the latching arms having latching extension pieces which protrude radially inward into the receiving openings and which interact in a latching manner with an annular groove formed in the plug-in coupling parts.

13. The coupling device of claim 12, wherein the latching arms associated with each socket-receiving opening have locking extension pieces oriented in the joining direction which, in the connected state of the coupling plate parts, engage an annular gap associated with each plug-receiving opening whereby when so engaged, the annular gap surrounds the latching arms such that the latching arms of the two coupling plate parts are locked against a radial movement.

14. The coupling device of claim 12, wherein the annular groove of each plug-in coupling part and wherein each latching extension piece have interacting paired surfaces comprising first oblique surfaces and second oblique surfaces, and further wherein the first paired oblique surfaces interact in the insertion direction and define a first angle as measured by a plug-in axis, and further wherein the second paired oblique surfaces interact in a removal direction and define a second angle as measured by the plug-in axis.

15. The coupling device of claim 14, wherein the first angle is smaller than the second angle.

16. The coupling device of claim 14, wherein the first angle lies in the range of 30° to 45°, and the second angle lies in the range 45° to 60°.

17. The coupling device of claim 1, wherein each plug-in coupling part has a stop element configured to engage the coupling part so as to limit the insertion distance of the plug-in coupling part.

18. The coupling device of claim 1, wherein the plug-in coupling parts further comprise a drive-in spike on which a plastic pipe conduit is placed.

19. A pair of connected coupling plate parts used as a coupling device for tubes or pipes used in wall ducts of flow media conduits that connect plug-in coupling parts configured as plug parts and socket parts, the pair of coupling plate parts being comprised of:

two identical, interconnectable, and molded coupling plate parts, each said coupling plate part having at least one first and one second receiving opening for the insertion and for the fixed securing of at least one plug part and at least one socket part, the at least one first receiving opening and the at least one second receiving opening differing in construction from one another, and each coupling plate part being arranged such that the at least one first receiving opening for a plug part is opposite to the at least one second receiving opening for a socket part, wherein the at least one first receiving opening and the at least one second receiving opening on each of the coupling plate parts are arranged in a pair symmetrically with respect to an axis of symmetry of each of the coupling plate parts, wherein the connection of the two coupling plate parts results in the at least one plug part, secured within the at least one first receiving opening of one of the coupling plate parts, being plugged into and paired in a joining direction with the at least one socket part, and secured within the at least one second receiving opening of the other coupling plate part.

20. The pair of coupling plate parts of claim 19, further comprising latching means configured to fix the plug part and socket part in the at least one first and one second receiving openings associated with the plug part and socket part respectively, wherein the latching means are not releasable when the coupling plate parts are connected, and further wherein the latching means are releasable when the coupling plate parts are not connected such that the plug parts and the socket parts are releasable from a rear side of the coupling plate part facing away from a coupling side of the other coupling plate part.

21. A coupling plate part used in a coupling device for tubes or pipes used in wall ducts of flow media conduits that connect plug-in coupling parts configured as plug parts and socket parts, the coupling plate part comprising:

at least a first and a second receiving opening, the first receiving opening having a different construction than the second receiving opening, the first receiving opening adapted for the insertion and fixed securing of the plug part, the second receiving opening adapted for the insertion and fixed securing of the socket part;

wherein the first receiving opening and the second receiving opening are arranged on a common surface of the coupling plate part opposite each other in a pair mirror—symmetrically with respect to an axis of symmetry of the coupling plate part.

* * * * *

UNITED STATES PATENT AND TRADEMARK OFFICE

CERTIFICATE OF CORRECTION

PATENT NO. : 8,256,801 B2
APPLICATION NO. : 11/782471
DATED : September 4, 2012
INVENTOR(S) : Harald Hagen et al.

It is certified that error appears in the above-identified patent and that said Letters Patent is hereby corrected as shown below:

In the Specifications:

Column 1, line 30, after "coupling" delete "C".

Column 2, line 1, after "through" delete "1800" and insert --180°--.

Column 4, line 47, after "part" delete "20118" and insert --20/18--.

Signed and Sealed this
Fourth Day of June, 2013

Teresa Stanek Rea
*Acting Director of the United States Patent and Trademark Office*